Nov. 17, 1953   F. W. CUNNINGHAM   2,659,849
AUTOMATIC CAM CUTTING MOTOR CONTROL APPARATUS
Filed Oct. 19, 1950   2 Sheets-Sheet 1
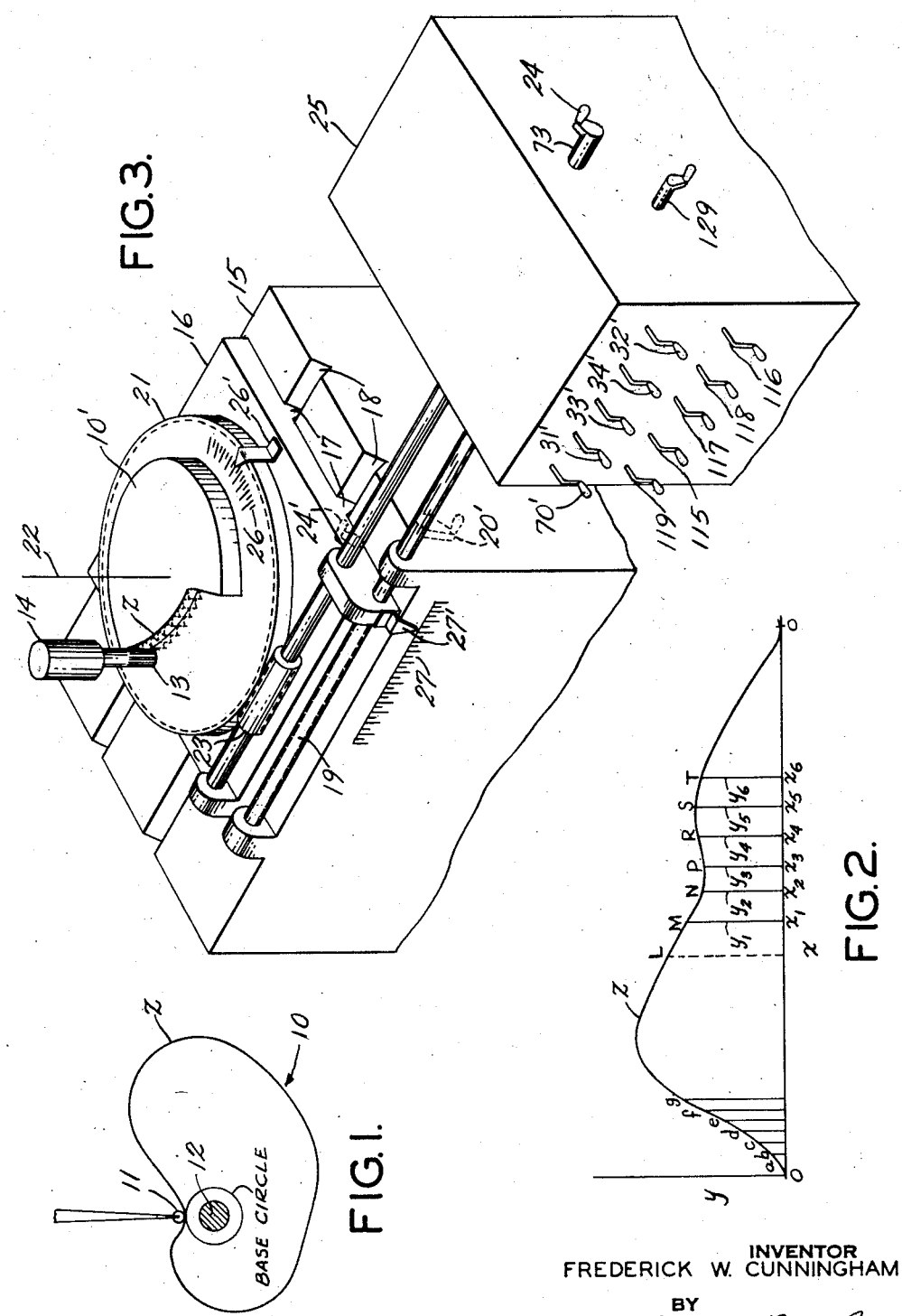
INVENTOR
FREDERICK W. CUNNINGHAM
BY
his ATTORNEYS Patented Nov. 17, 1953

2,659,849

UNITED STATES PATENT OFFICE 2,659,849

AUTOMATIC CAM CUTTING MOTOR CONTROL APPARATUS

Frederick W. Cunningham, Stamford, Conn., assignor to Arma Corporation, Brooklyn, N. Y., a corporation of New York Application October 19, 1950, Serial No. 190,956

20 Claims. (Cl. 318—30)

1

This invention relates to automatic control apparatus, and has particular reference to mechanism for accurately controlling contour-shaping devices such as cam cutters, for example, although the invention is not limited to that use.

The cutting of a number of like cams is accomplished by the use of a master cam which controls the mass production cutters and which must be accurately formed. Heretofore, the master cam was formed by cutting the blank at a great number of closely-spaced points on the cam curve which are resolved into $x$ and $y$ coordinates, the blank being positioned for each cutting point with respect to the tool according to one of these coordinates, say $x$, and a cut is taken at that position according to the other coordinate, $y$. The blank is then withdrawn from the tool, repositioned, and another cut made for the succeeding point. This process is repeated until the blank is shaped to conform to a rough cam contour and the blank is then finished by grinding or filing. Inasmuch as the tool and blank setting as well as the grinding and filing are largely manual operations, there are many opportunities for error and consequently the work must be expertly done and is a time-consuming and costly operation.

In accordance with the present invention, an economical yet accurate and simple apparatus for producing the master cam is provided in which the $x$ and $y$ coordinates of a number of substantially equally spaced points along the $x$ axis on the cam curve are determined, and the cam cutter is servo-controlled for the portion of the curve between any two adjacent points in accordance with a cubic curve fitted through these two points and the next adjacent point on each side thereof. The constant term and the constant coefficients of the first three powers of the variable along the $x$ axis for the cubic curve passing through the four chosen points are determined mechanically from the known values of $y$ for these points.

More specifically, the apparatus includes three cascade-connected induction potentiometers, whose rotor windings are simultaneously angularly adjusted to accord with the $x$ axis variable, and whose induced voltages severally energize three other induction potentiometers having series-connected rotor windings which are displaced angularly according to the computed coefficients. The resulting electrical signal, proportional to the difference between the computed value of $y$, corresponding to a given value of $x$, and the computed constant term is used to control a servo-

2 system which automatically positions the cutter according to the calculated $y$ value for a manually-inserted $x$ value.

It will be seen that the control apparatus accurately regulates the cutting of the master cam blank and that, by using two similar computing circuits and by gradually fading the servo-system control from one circuit to the other circuit in the vicinity of the chosen points, a smooth cam is produced automatically and with fewer operations than previously.

For a more complete understanding of the invention, reference may be had to the accompanying drawings, in which:

Figure 1 illustrates a plate cam;

Fig. 2 illustrates the cam curve for the cam shown in Fig. 1;

Fig. 3 is a perspective view of the blank holding and cutting portion of a cam cutting machine.

Figure 4:
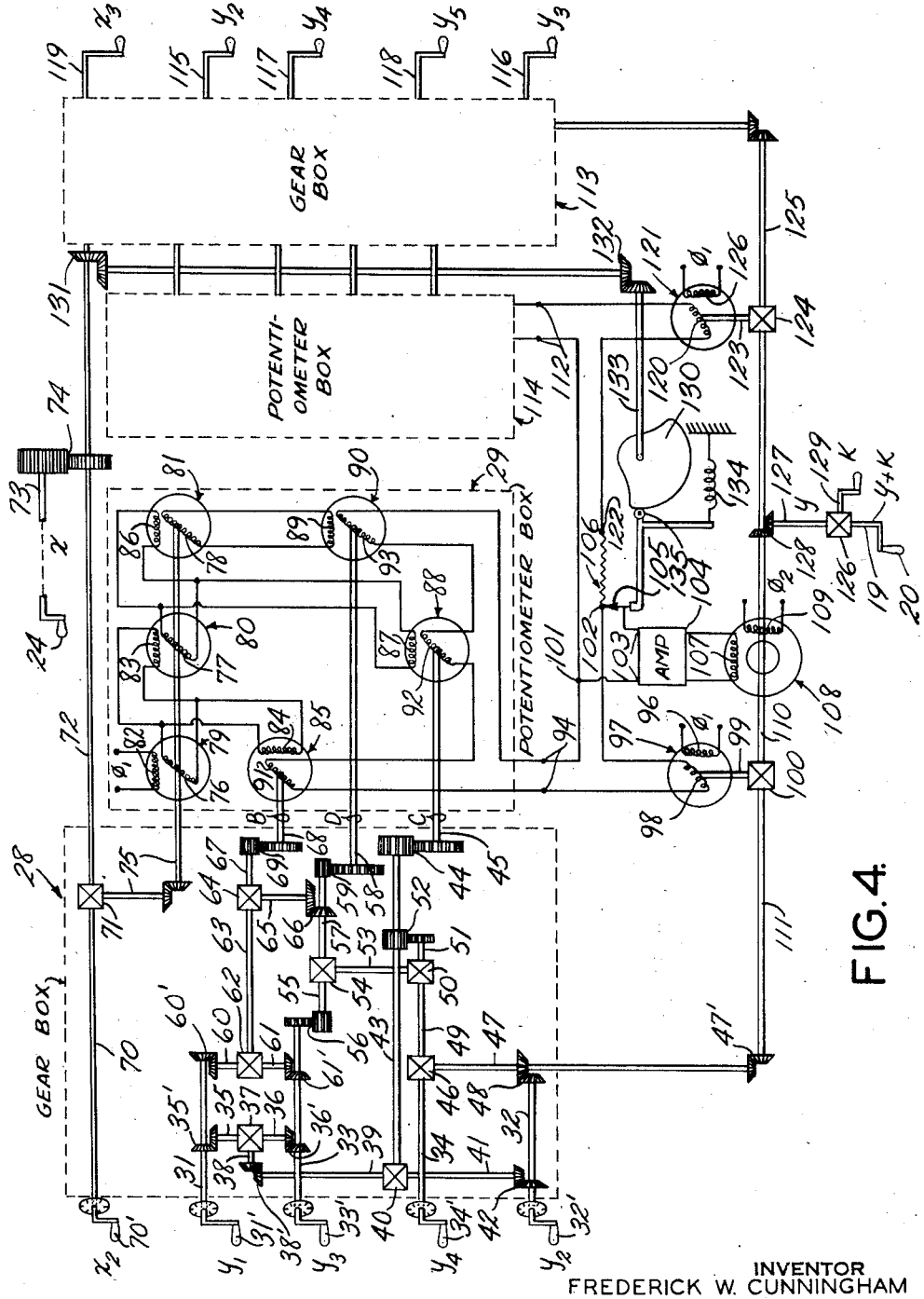
Fig. 4 is a schematic diagram of the electromechanical computing mechanism of the present invention adapted to automatically control the cam cutter shown in Fig. 3.

Referring to Fig. 1 of the drawings, numeral 10 designates the plate cam which is to be cut and having a contour such that the follower 11 is displaced according to the curve Z of Fig. 2, where $x$ represents the angular displacement of shaft 12 which carries cam 10 and $y$ represents the rectilinear displacement of follower 11.

The cam 10 is to be cut from the blank 10′ on the conventional machine illustrated in Fig. 3, in which the rotating cutting tool 13 is driven by vertical motor 14 held in a suitable support, not shown, in a constant position relatively to the bed 15 of the machine. Carrier 16, supported by guides 17 which fit in V-shaped grooves 18 of bed 15, is driven longitudinally by rotating lead screw 19, the position of the carrier 16 relatively to the bed 15 being indicated by pointer 27′ on fixed scale 27. The rotary work table 21, which is essentially a large diameter gear, carries the cam blank 10 and is mounted on carrier 16 for rotation about the vertical axis 22 by worm gear 23, the angular position of work table 21 being indicated on its scale 26 by the fixed pointer 26′. As lead screw 19 is rotated, the work table 21 moves rectilinearly under the tool 13, which is located in a position such that the relative path of the cutter 13 is along a radius of the work carrier 21.

According to the cutting methods employed heretofore, carrier 16 is manually stepped to succeeding longitudinal positions by a hand crank 20' on lead screw 19, and work table 21 is rotated about axis 22 by a hand crank 24' on worm 23, cuts being made according to the $x$ and $y$ coordinates of a large number of closely-spaced points O, $a$ to $g+$, on the cam curve, as shown in Fig. 2. The blank is driven against the cutter 13 as the cranks 20' and 24' are adjusted to the readings of $x$ on scale 26 and the readings of O, $a$ to $g+$, on scale 27, with the result that the blank 10' has the scalloped appearance shown in phantom in Fig. 3, and must be finished by filing or grinding to the cam contour described by the bottoms of the tool cuts. However, with the apparatus of the present invention, the carrier 16 is automatically and accurately positioned according to the angular displacement of rotary work table 21 to immediately make the smooth cam contour shown by the solid line in Fig. 3, thereby eliminating or greatly minimizing finishing operations.

Referring to Fig. 2, a cubic curve of the form $$y = A + B(x-x_2) + C(x-x_2)^2 + D(x-x_2)^3 \quad (1)$$

can be fitted through any four chosen points on the cam curve Z, such as points M, N, P and R, in Fig. 2, for example, whose known coordinates are $(x_1, y_1)$, $(x_2, y_2)$, $(x_3, y_3)$, and $(x_4, y_4)$, respectively, where A, B, C and D are constants, and Equation 1 represents a mathematical solution for the value of the ordinate $y$ for any value of the abscissa $x$. This computed curve very closely approximates the given cam curve Z between points N and P and, if the points M, N, P and R are so chosen that the differences between adjacent abscissae $x_1$ and $x_2$, between $x_2$ and $x_3$, and between $x_3$ and $x_4$ are unity, four simultaneous equations in A, B, C and D are available by substituting the known coordinates of M, N, P and R in four equations for $y_1$, $y_2$, $y_3$ and $y_4$. From these four equations the values for the constants A, B, C and D may be derived by the usual methods, and are found to be the following:

$$A = y_2 \quad (2)$$

$$B = \frac{(y_3 - y_1 - 2D)}{2} \quad (3)$$

$$C = \frac{(y_3 + y_1 - 2y_2)}{2} \quad (4)$$

$$D = \frac{(y_4 - 2y_3 + y_2 - 2C)}{6} \quad (5)$$

The adjustment of carrier 16 by lead screw 19 and of rotary work table 21 by worm 23 are automatically controlled from and computed in the apparatus shown in Fig. 4, which is contained in housing 25 of Fig. 3 and responds to certain manual inputs, to be described. Thus, the constants A, B, C and D are automatically computed in gear box 28 shown in Fig. 4 from mechanical inputs of $y_1$, $y_2$, $y_3$ and $y_4$ supplied manually by respective input shafts 31, 32, 33 and 34, which are rotated by cranks 31', 32', 33' and 34', respectively, to positions where their angular displacements from defined zero positions are proportional respectively to the known values of $y_1$, $y_2$, $y_3$ and $y_4$. The angular displacement of $y_2$ input shaft 32 is therefore proportional to A in accordance with Equation 2.

The $y_1$ and $y_3$ input shafts 31 and 33, respectively, drive shafts 35 and 36 through similar bevel gearing 35', 36', these shafts being connected to the input gears of mechanical differential 37, the angular displacement of whose output shaft 38 is proportional to the sum of the displacements of the input shafts, i. e., the output of differential 37 is proportional to $y_1 + y_3$. Differential output shaft 38 drives input shaft 39 of mechanical differential 40 through bevel gearing 38', while the other input shaft 41 of differential 40 is driven by shaft 32 through bevel gearing 42 having a ratio of one to two.

The output shaft 43 of differential 40 is displaced by an amount proportional to the difference between the displacements of the differential input shafts 39 and 41 so that the displacement of differential output shaft 43 is proportional to $y_3 + y_1 - 2y_2$, which is proportional to 2C, according to Equation 4. Shaft 43 also drives shaft 45 through reduction spur gearing 44 at one-half speed, so that the displacement of shaft 45 is proportional to C.

The $y_4$ input shaft 34 drives one input gear of mechanical differential 46, the other input gear being driven by $y_2$ input shaft 32 through bevel gearing 48 and shaft 47. The displacement of the output shaft 49 of differential 46 is proportional to the sum of the displacements of the input shafts 34 and 47, i. e., proportional to $y_2 + y_4$.

Shaft 49 also drives one input gear of mechanical differential 50, the other input gear of which is driven by shaft 43 through spur gearing 52 and shaft 51. The displacement of the differential output shaft 53 of differential 50 is proportional to the difference between the displacements of the differential input shafts 49 and 51, so that the displacement of differential output shaft 53 is proportional to $y_2 + y_4 - 2C$.

Shaft 53 also drives one input gear of mechanical differential 54 whose other input gear is driven by $y_3$ input shaft 33 through double speed spur gearing 56 and shaft 55. The displacement of the output shaft 57 of differential 54 is proportional to the difference between the displacements of the differential input shafts 53 and 55, i. e., it is proportional to $y_2 + y_4 - 2C - 2y_3$ which is in turn proportional to 6D, according to Equation 5. Shaft 58 is driven by shaft 57 through reduction gearing 59 of such ratio that the displacement of shaft 58 is proportional to D.

Manual input shafts 31 and 33 for $y_1$ and $y_3$ are connected through respective bevel gearing 60' and 61' to the respective input shafts 60 and 61 of mechanical differential 62, the displacement of whose output shaft 63 is proportional to the difference between the displacements of the input shafts 61 and 60, i. e., it is proportional to $y_3 - y_1$. Differential output shaft 63 also drives one input gear of mechanical differential 64, the other input shaft 65 of which is driven by shaft 57 at one-third speed by reducing bevel gearing 66.

The displacement of the output shaft 67 of differential 64 is proportional to the difference of the displacements of the input shafts 63 and 65, i. e., it is proportional to $y_3 - y_1 - 2D$. Shaft 68 is driven by shaft 67 at one-half speed by reducing spur gearing 69, so that the displacement of shaft 68 is proportional to $$\frac{(y_3 - y_1 - 2D)}{2}$$

which is proportional to B, according to Equation 3.

Input shaft 70 connected to one input gear of mechanical differential 71, is angularly displaced by crank 70' from its defined zero position by an amount proportional to $x_2$, while the other input shaft 72 of differential 71 is driven by shaft 73 through spur gearing 74. Shaft 73 is displaced angularly by an amount proportional to $x$, and is preferably driven by crank 24 of Fig. 3 by mechanical or electromechanical means, not shown, but contained in casing 25. The displacement of the output shaft 75 of differential 71 is proportional to the difference between the displacements of the respective $x$ and $x_2$ input shafts 72 and 70, i. e., the displacement of shaft 75 is proportional to $x-x_2$.

Shaft 75 is connected to and drives the rotor windings 76, 77 and 78 of three cascade-connected induction potentiometers 79, 80 and 81, respectively. The induction potentiometer is a transformer, having a primary winding, and a secondary winding rotatable relatively to the primary winding, in which the amplitude of the secondary winding output voltage is directly proportional to the product of the amplitude of the primary winding excitation voltage and the angular displacement of the secondary winding from the defined zero position, which is the position where the magnetic axes of the primary and secondary windings are mutually perpendicular. In this description the stator winding is used as the primary and the rotor winding is used as the secondary, although the opposite arrangement may also be used. In practice the primary windings of induction potentiometers are usually energized from booster amplifiers but for the sake of simplicity these amplifiers are not shown in Fig. 4. Stator winding 82 of potentiometer 79 is energized by a constant alternating voltage supply, $\phi_1$. Three other induction potentiometers 85, 90 and 88 have their rotor windings severally connected to shafts 68, 58 and 45, respectively, the rotor winding 76 of potentiometer 79 being electrically connected to the stator winding 83 of potentiometer 80 and to the stator winding 84 of induction potentiometer 85, so that they are simultaneously energized by voltage induced in rotor winding 76, which is proportional in magnitude to $x-x_2$.

Similarly, the rotor winding 77 of potentiometer 80 is electrically connected to stator winding 86 of potentiometer 81 and to stator winding 87 of potentiometer 88, so that they are simultaneously energized by the voltage induced in rotor winding 77, which is proportional in magnitude to $(x-x_2)^2$.

The rotor winding 78 of potentiometer 81 is connected to the stator winding 89 of potentiometer 90, so that the latter is energized by the voltage induced in rotor winding 78, which is proportional in magnitude to $(x-x_2)^3$.

The rotor windings 91, 92 and 93 of respective potentiometers 85, 88 and 90 are electrically connected in series with the output terminals 94 of the potentiometer box 29, containing potentiometers 79, 80, 81, 85, 88 and 90, and also housed in casing 25, so that the magnitude of the voltage at terminals 94 is the algebraic sum of the magnitudes of the voltages of rotor windings 91, 92 and 93. Inasmuch as voltage induced in rotor winding 91 is proportional in magnitude to $B(x-x_2)$, and the voltage induced in rotor winding 92 is proportional in magnitude to $C(x-x_2)^2$, and the voltage induced in rotor winding 93 is proportional in magnitude to $D(x-x_2)^3$, their sum is equal to $B(x-x_2)+C(x-x_2)^2+D(x-x_2)^3$. Since this sum plus A equals $y$ according to Equation 1 and A equals $y_2$ according to Equation 2, it follows that the voltage at output terminals 94 of potentiometer box 29 is proportional in magnitude to $y-y_2$.

The stator winding 96 of induction potentiometer 97 is energized by constant alternating voltage source $\phi_1$ and its rotor winding 98 is electrically connected in series with terminals 94, 101 and 102, so that the magnitude of the voltage between terminals 101 and 102 is the algebraic difference between the magnitudes of the voltages at terminals 94 and the output voltage of rotor winding 98.

One of the input terminals 103 of a conventional electronic amplifier 104 is connected to terminal 101, while the other terminal 103 of amplifier 104 is connected to brush 105 of slide wire resistor 106 connected between terminals 102 and 122. The output of amplifier 104 energizes control field winding 107 of two phase induction motor 108, the main field winding 109 of which is energized from constant alternating voltage source $\phi_2$ which is in quadrature with the control field voltage.

The extended shaft 110 of motor 108 drives one input gear of mechanical differential 100, the other input gear of which is driven by shafts 47 and 111 through bevel gearing 47'. The output shaft 99 of differential 100 is displaced through an angle proportional to the difference between the displacements of the differential input shafts 110 and 111, and is connected by shaft 99 to the rotor winding 98 of potentiometer 97.

Motor 108 drives the rotor winding 98 of potentiometer 97 through differential 100 to the position where the voltage between terminals 101 and brush 105 is zero, so that motor 108 is deenergized. Since brush 105 is shown in Fig. 4 in contact with terminal 102, the voltage output of rotor winding 98 is matched to the voltage at terminals 94, i. e. $y-y_2$. In this matched condition, the displacement of differential output shaft 99 is proportional to $y-y_2$, and since the displacement of shaft 111 is proportional to $y_2$, because it is driven by $y_2$ input shaft 32 through gearing 48, shaft 47, and gearing 47', the displacement of shaft 110 and of motor 108 is proportional to $y$.

During the time that this solution of $y-y_2$ is being produced at output terminals 94 by the mechanical operations in gear box 28 and the electromechanical operations in potentiometer box 29, a solution for $y-y_3$ from the four points N, P, R and S is being similarly produced at terminals 112 by like mechanical operations in gear box 113 and electromechanical operations in potentiometer box 114, which are similar to gear box 28 and potentiometer box 29, respectively. These operations of gear box 113 and potentiometer box 114 are produced from manual inputs of $y_2$, $y_3$, $y_4$, $y_5$ and $x_2$ at shafts 115, 116, 117, 118 and 119, respectively, of gear box 113.

The output terminals 112 of potentiometer box 114 are electrically connected in series with rotor winding 120 of induction potentiometer 121, terminal 101 and terminal 122 of slide wire resistor 106, so that the voltage between terminals 101 and 122 is the algebraic difference between the voltage at terminals 112 and the output voltage of rotor winding 120.

Stator winding 126 of induction potentiometer 121 is energized from the constant alternating voltage source $\phi_1$ and its rotor winding 120 is driven by the output shaft 123 of mechanical differential 124, whereby the angular displacement of shaft 123 and rotor winding 120 is proportional to the difference between the angular displacements of the input shafts 110 and 125 of differential 124. Shaft 125 is displaced by crank shaft 116 by an amount proportional to $y_3$, through gearing and shafting similar to that between shafts 32 and 111 of gear box 28, whereas shaft 110 is driven by motor 108, so that the corresponding input gears of differential 124 are displaced accordingly. When brush 105 of slide wire resistor 106 is positioned at terminal 102 as shown, the voltage between terminals 101 and 122 does not affect the input to motor 108, assuming the amplifier 104 input resistance to be sufficiently high, and the solution of $y$ at shaft 110 corresponds to the $y-y_2$ signal at terminals 94.

On the other hand, when brush 105 is in contact with opposite end terminal 122, the voltage between terminals 101 and 102 does not affect motor 108, and the motor 108 deenergizes itself by reducing the voltage between terminals 101 and 122 to zero by driving rotor winding 120 of induction potentiometer 121 to a position such that the displacement of shaft 110 is proportional to $y$, according to the $y-y_3$ signal at terminals 112. With contact 105 positioned between terminals 102 and 122, the motor 108 drives shaft 110 to a position where the displacement of shaft 110 corresponds to an average of the two solutions for $y$, weighted according to the position of brush 105 with respect to the terminals 102 and 122 of the slide wire resistor 106.

In operation of the automatic cutter control of this invention, the values of $y_1$, $y_2$, $y_3$, $y_4$, $y_5$, $x_2$ and $x_3$, are introduced manually by manipulation of respective cranks 31', 32' or 115, 33' or 116, 34' or 117, 118, 70' and 119, of gear boxes 28 and 113, these cranks being shown as arranged on the panel of casing 25 in Fig. 3. As crank 24 is turned, thereby controlling the rotation of worm 23 and work table 21, a value of $x$ is introduced at shafts 73 and 72, and electrical solutions for $y-y_2$ and $y-y_3$ are produced at terminals 94 and 112 respectively, as previously described.

The position of the movable brush 105 on the slide wire resistor 106 is controlled by cam 130, driven by shaft 72 through gearing 131, 132 and shaft 133. Cam follower 135, which carries the movable brush 105, is urged against the surface of cam 130 by the spring 134. The shape and speed of cam 130 is such that the motion of brush 105 follows the reciprocating action described in the following paragraphs. For displacements of shaft 72 corresponding to the $x$ values of points M, N, P, R etc., the brush 105 is in the center of resistor 106, while for displacements of shaft 72 corresponding to $x$ values between points M, N, P and R etc., the brush 105 dwells for the most part, on terminal 102 or 122, as will be explained.

For values of $x$ between $x_2+\Delta$ and $x_3-\Delta$, where $\Delta$ is approximately equal to one-tenth of the difference between successive abscissae, i. e., $$\frac{(x_2-x_1)}{10}$$

the brush 105 cooperates with terminal 102 thereby giving a solution of $y$ at shaft 110 corresponding to the cubic curve through points M, N, P and R of Fig. 2. As $x$ increases from $x_3-\Delta$ to $x_3+\Delta$, the brush 105 is linearly displaced along resistor 106 so that the solution of $y$ at shaft 110 of motor 108 corresponds to a weighted average of the values of $y$ corresponding to the cubic curves through points M, N, P, R and through N, P, R, S.

For values of $x$ between $x_3+\Delta$ and $x_4-\Delta$, brush 105 is in contact with terminal 122 and the solution for $y$ at shaft 110 of motor 108 corresponds to the value of $y$ for the cubic curve passing through points N, P, R, S. At the same time values of $x_4$, $y_3$, $y_4$, $y_5$ and $y_6$ are introduced at shafts 70, 31, 32, 33 and 34 respectively, by respective cranks 70', 31', 32', 33' and 34', and a signal proportional to $y-y_4$ is correspondingly produced at terminals 94.

For values of $x$ between $x_4-\Delta$ and $x_4+\Delta$, brush 105 is moved back to terminal 102 and the operation of the computer continues as described.

Shaft 110 preferably drives lead screw 19 and rectilinear carrier 16 through a mechanical differential 126, one input gear of which is driven by shaft 110 and by shaft 127 through bevel gearing 128, while the other input gear is manually displaced by a constant amount, K, by crank 129. The displacement of lead screw 19 and carrier 16 is then proportional to $y+K$, so that by adjusting the displacement of carrier 16 by means of crank 129, rough cuts may be taken and cams of different base circles may be produced.

It will be understood that in cam cutting machines of the conventional type, lead screw 19 is directly adjusted manually by crank 20' and work table 21 is rotated by manipulation of crank 24', without the control afforded the present invention whose mechanism as shown in Fig. 4 is housed in casing 25 shown in Fig. 3 and produces the smooth cam surface Z shown as a solid line in Fig. 3 rather than the scalloped surface produced by the conventional method and shown in phantom and requiring considerable finishing by grinding or filing, or both. By making a smooth cam in accordance with this invention, not only is the hand finishing reduced to a minimum, but an accurate master cam is provided which affords large quantity reproduction of equally accurate replicas.

Although a cubic curve fitted through known points on the cam curve Z controls the cutter 13 according to operations set forth in the preceding description, it is evident that any higher degree equation may be employed for greater accuracy by using the same principles. Also, it is to be understood that the invention is not restricted to control of cam cutters, but may be applied with equal facility to any shaping or contour-forming device in which the shape or contour is determined by a sequence of known coordinates on a curve, all within the scope of the appended claims. Furthermore, although induction potentiometers are referred to throughout, resistance potentiometers may equally well be employed. Also, methods other than cascaded linear potentiometers may be used to supply the voltages proportional to the second and third powers of the $x$ variable, such as tapered potentiometers for example.

I claim:

1. In automatic control apparatus for machine tools and the like, the combination of first potentiometer means having an energized stator winding and a cooperating member movable relatively thereto, mechanical input means for adjusting said movable member relatively to said winding, second potentiometer means having a stator winding and a cooperating member movable relatively thereto, electrical connections between the movable member of said first potentiometer means and the winding of said second potentiometer means, second mechanical input means for adjusting the movable member of said second potentiometer means, third potentiometer means having an energized stator winding and a cooperating member movable relatively thereto, motive means having a control winding, electrical connections between the outputs of said second and third potentiometer means and said control winding, and operative connections between said motive means and the movable members of said second and third potentiometer means for adjusting the same relatively to the corresponding windings.

2. In automatic control apparatus for machine tools and the like, the combination of a plurality of first potentiometers each having relatively movable cooperating members, a source of electrical power, electrical connections between said power source and one of the members of said potentiometers whereby said potentiometers are energized from a common source of power, common mechanical input means for simultaneously relatively adjusting the other member of each of said potentiometers, a plurality of second potentiometers corresponding to said first potentiometers and each having relatively movable cooperating members, several electrical connections between the other members of said first potentiometers and one of the members of the corresponding second potentiometers, mechanical input means for relatively adjusting the other members of each of said second potentiometers, a third potentiometer having relatively movable cooperating members, electrical connections between said power source and one of the members of said third potentiometer, electrical motive means having a control winding, electrical connections between the other members of said second and third potentiometers and said control winding for energizing the latter, and operative connections between said motive means and said other member of said third potentiometer for relatively adjusting the members thereof.

3. In automatic control apparatus for machine tools and the like, the combination of a plurality of first potentiometers each having an energized winding and a cooperating member movable relatively thereto, mechanical input means for simultaneously adjusting the movable members of said potentiometers, a plurality of second potentiometers corresponding to said first potentiometers and each having a winding and a cooperating member movable relatively thereto, several electrical connections between the movable members of said first potentiometers and the winding of the corresponding second potentiometers, mechanical input means for severally adjusting the movable members of said second potentiometers, a third potentiometer having an energized winding and a cooperating member movable relatively thereto, motive means having a control winding, series connections between the movable members of said second and third potentiometers and said control winding for energizing the latter, and operative connections between said motive means and the movable member of said third potentiometer for adjusting the same relatively to the winding thereof.

4. In automatic control apparatus for machine tools and the like, the combination of a plurality of first potentiometers each having a winding and a cooperating member movable relatively thereto, electrical connections between the output of one of said potentiometers and the winding of another of said potentiometers, mechanical input means for simultaneously adjusting the movable members of said potentiometers, a plurality of second potentiometers each having a winding and a cooperating member movable relatively thereto, several series connections between the outputs of said first potentiometers and the corresponding windings of said second potentiometers, mechanical input means for severally rotating the movable members of said second potentiometers, a third potentiometer having an energized winding and a cooperating movable member, motive means having a control winding, series connections between the outputs of said second and third potentiometers and said control winding, and operative connections between said motive means and the movable member of said third potentiometer.

5. In automatic control apparatus for machine tools and the like, the combination of a plurality of first induction potentiometers each having a stator and a rotor winding, cascade connections between the respective stator windings and rotor windings, mechanical input means for simultaneously rotating said rotor windings, a plurality of second induction potentiometers each having a stator and a rotor winding, series connections between the respective stator windings of said second potentiometers and the rotor windings of corresponding first potentiometers, mechanical input means for severally rotating the rotor windings of said second potentiometers, a third induction potentiometer having an energized stator winding and a rotor winding, motive means having a control winding, series connections between the rotor windings of said second and third potentiometers and said control winding, and operative connections between said motive means and the rotor winding of said third potentiometer.

6. In automatic control apparatus for machine tools and the like, the combination of a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, mechanical input means for severally rotating the rotor windings of said second potentiometers, a third induction potentiometer having an energized stator winding and a rotor winding, motive means having a control winding, series connections between the rotor windings of said second and third potentiometers and said control winding, operative connections between said motive means and the rotor winding of said third potentiometer, and means in the connections between said motive means and the rotor winding of said third potentiometer for modifying the angular position thereof.

7. In automatic control apparatus for machine tools and the like, the combination of a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, mechanical input means for severally rotating the rotor windings of said second potentiometers, a third induction potentiometer having an energized stator winding and a rotor winding, motive means having a control winding, series connections between the rotor windings of said second and third potentiometers and said control winding, operative connections between said motive means and the rotor winding of said third potentiometer, and means interposed in said series connections for modifying the operation of said motive means.

8. In automatic control apparatus for machine tools and the like, the combination of a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, mechanical input means for severally rotating the rotor windings of said second potentiometers, a third induction potentiometer having an energized stator winding and a rotor winding, motive means having a control winding, series connections between the rotor windings of said second and third potentiometers and said control winding, operative connections between said motive means and the rotor winding of said third potentiometer, and a variable resistor interposed in said series connections for modifying the operation of said motive means.

9. In automatic control apparatus for machine tools and the like, the combination of a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, mechanical input means for severally rotating the rotor windings of said second potentiometers, a third induction potentiometer having an energized stator winding and a rotor winding, motive means having a control winding, series connections between the rotor windings of said second and third potentiometers and said control winding, operative connections between said motive means and the rotor winding of said third potentiometer, and control connections between said motive means and the cutting element of the said machine tool.

10. In automatic control apparatus for machine tools and the like, the combination of a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, mechanical input means for severally rotating the rotor windings of said second potentiometers, a third induction potentiometer having an energized stator winding and a rotor winding, motive means having a control winding, series connections between the rotor windings of said second and third potentiometers and said control winding, operative connections between said motive means and the rotor winding of said third potentiometer, control connections between said motive means and the cutting element of the said machine tool, and means in said control connections for modifying the control of the tool by said motive means.

11. In automatic control apparatus for machine tools and the like having a cutting element adjustable relatively to the work along coordinate axes, the combination of a plurality of first induction potentiometers having their respective stator windings and rotor windings connected in cascade, mechanical input means for simultaneously rotating the rotor windings of said potentiometers in accordance with adjustments along one of said coordinate axes, a plurality of second induction potentiometers having their respective stator windings severally connected in series with the rotor windings of corresponding first potentiometers, mechanical input means for severally rotating the rotor windings of said second potentiometers in accordance with the other of said coordinate axes, a third induction potentiometer having an energized stator winding and a rotor winding, motive means having a control winding, series connections between the rotor windings of said second and third potentiometers and said control winding, operative connections between said motive means and the rotor winding of said third potentiometer, and control connections between said motive means and the said cutting element for advancing the latter along one of said coordinate axes.

12. In automatic control apparatus for machine tools and the like, the combination of a first control unit comprising a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, mechanical input means for severally rotating the rotor windings of said second potentiometers, a third induction potentiometer having an energized stator winding and a rotor winding, a second control unit comprising a plurality of said first induction potentiometers and a plurality of said second induction potentiometers and said third induction potentiometer and said corresponding mechanical input means, motive means having a control winding, series connections between the rotor windings of said second and third potentiometers of said first unit and between the rotor windings of said second and third potentiometers of said second control unit and said control winding, and operative connections between said motive means and the rotor winding of said third potentiometer of both said first and second control units.

13. In automatic control apparatus for machine tools and the like, the combination of a first control unit comprising a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, mechanical input means for severally rotating the rotor windings of said second potentiometers, a third induction potentiometer having an energized stator winding and a rotor winding, a second control unit comprising a plurality of said first induction potentiometers and a plurality of said second induction potentiometers and said third induction potentiometer and said corresponding mechanical input means, motive means having a control winding, series connections between the rotor windings of said second and third potentiometers of said first unit and between the rotor windings of said second and third potentiometers of said second control unit and said control winding, operative connections between said motive means and the rotor winding of said third potentiometer of both said first and second control units, and means in the connections between said motive means and the rotor windings of each of said third potentiometers for modifying the angular positions thereof.

14. In automatic control apparatus for machine tools and the like, the combination of a first control unit comprising a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, mechanical input means for severally rotating the rotor windings of said second potentiometers, a third induction potentiometer having an energized stator winding and a rotor winding, a second control unit comprising a plurality of said first induction potentiometers and a plurality of said second induction potentiometers and said third induction potentiometer and said corresponding mechanical input means, motive means having a control winding, series connections between the rotor windings of said second and third potentiometers of said first unit and between the rotor windings of said second and third potentiometers of said second control unit and said control winding, operative connections between said motive means and the rotor winding of said third potentiometer of both said first and second control units, and means interposed in the said series connections for modifying the operation of said motive means.

15. In automatic control apparatus for machine tools and the like, the combination of a first control unit comprising a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, mechanical input means for severally rotating the rotor windings of said second potentiometers, a third induction potentiometer having an energized stator winding and a rotor winding, a second control unit comprising a plurality of said first induction potentiometers and a plurality of said second induction potentiometers and said third induction potentiometer and said corresponding mechanical input means, motive means having a control winding, series connections between the rotor windings of said second and third potentiometers of said first unit and between the rotor windings of said second and third potentiometers of said second control unit and said control winding, operative connections between said motive means and the rotor winding of said third potentiometer of both said first and second control units, and a variable resistor interposed in the said series connections for modifying the operation of said motive means.

16. In automatic control apparatus for machine tools and the like, the combination of a first control unit comprising a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, mechanical input means for severally rotating the rotor windings of said second potentiometers, a third induction potentiometer having an energized stator winding and a rotor winding, a second control unit comprising a plurality of said first induction potentiometers and a plurality of said second induction potentiometers and said third induction potentiometer and said corresponding mechanical input means, motive means having a control winding, series connections between the rotor windings of said second and third potentiometers of said first unit and between the rotor windings of said second and third potentiometers of said second control unit and said control winding, operative connections between said motive means and the rotor winding of said third potentiometer of both said first and second control units, a variable resistor having a winding interposed in said series connections and having a brush movable relatively thereto, and operative connections between said first mechanical input means and said brush for modifying the operation of said motive means.

17. In automatic control apparatus for machine tools and the like, the combination of a first control unit comprising a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, mechanical input means for severally rotating the rotor windings of said second potentiometers, a third induction potentiometer having an energized stator winding and a rotor winding, a second control unit comprising a plurality of said first induction potentiometers and a plurality of said second induction potentiometers and said third induction potentiometer and said corresponding mechanical input means, motive means having a control winding, series connections between the rotor windings of said second and third potentiometers of said first unit and between the rotor windings of said second and third potentiometers of said second control unit and said control winding, operative connections between said motive means and the rotor winding of said third potentiometer of both said first and second control units, a variable resistor having a winding interposed in said series connections and having a brush movable relatively thereto, variable motion means connected to said brush for adjusting the same relatively to the resistor winding, and operative connections between said first mechanical input means and said variable motion means to drive the same for modifying the operation of said motive means.

18. In automatic control apparatus for machine tools and the like, the combination of a plurality of first potentiometers each having an energized winding and a cooperating member movable relatively thereto, mechanical input means for simultaneously adjusting the movable members of said potentiometers, a plurality of second potentiometers corresponding to said first potentiometers and each having a winding and a cooperating member movable relatively thereto, several electrical connections between the movable members of said first potentiometers and the windings of the corresponding second potentiometers, a plurality of second mechanical input means for severally adjusting the movable members of said second potentiometers, operative connections severally interposed between said second mechanical input means for modifying the adjustment of the movable members of said second potentiometers, a third potentiometer having an energized winding and a cooperating member movable relatively thereto, motive means having a control winding, series connections between the movable members of said second and third potentiometers and said control winding for energizing the latter, operative connections between said motive means and the movable member of said third potentiometer for adjusting the same relatively to the winding thereof, and operative connections between one of said second mechanical input means and the movable member of said third potentiometer for modifying the adjustment of the movable member thereof by said motive means.

19. In automatic control apparatus for machine tools and the like, the combination of a plurality of first potentiometers each having an energized winding and a cooperating member movable relatively thereto, mechanical input means for simultaneously adjusting the movable members of said potentiometers, a plurality of second potentiometers corresponding to said first potentiometers and each having a winding and a cooperating member movable relatively thereto, several electrical connections between the movable members of said first potentiometers and the windings of the corresponding second potentiometers, a plurality of second mechanical input means for severally adjusting the movable members of said second potentiometers, gearing interposed between said second mechanical input means for severally modifying the adjustment of the movable members of said second potentiometers, a third potentiometer having an energized winding and a cooperating member movable relatively thereto, motive means having a control winding, series connections between the movable members of said second and third potentiometers and said control winding for energizing the latter, operative connections between said motive means and the movable member of said third potentiometer for adjusting the same relatively to the winding thereof, and differential gearing between one of said second mechanical input means and the movable member of said third potentiometer for modifying the adjustment of the movable member thereof by said motive means.

20. In automatic control apparatus for machine tools and the like, the combination of a first control unit comprising a plurality of first induction potentiometers having their respective stator windings and rotor windings connected in cascade, mechanical input means for simultaneously rotating the rotor windings of said potentiometers, a plurality of second induction potentiometers having their respective stator windings severally connected in series with the rotor windings of corresponding first potentiometers, second mechanical input means for severally rotating the rotor windings of said second potentiometers, gearing interposed between said second mechanical input means for severally modifying the rotation of the rotor windings of said second potentiometers by the corresponding second mechanical input means, a third induction potentiometer having an energized stator winding and a rotor winding, a second control unit comprising a plurality of said first induction potentiometers and a plurality of said second induction potentiometers and said third induction potentiometer and said corresponding mechanical input means including said gearing, motive means having a control winding, series connections between the rotor windings of said second and third potentiometers of said first unit and between the rotor windings of said second and third potentiometers of said second control unit and said control winding, operative connections between said motive means and the rotor winding of said third potentiometer of both said first and second control units, and differential gearing between the second mechanical input means of each said unit and the rotor winding of the corresponding third potentiometer for modifying the rotation of the corresponding rotor windings by said motive means.

FREDERICK W. CUNNINGHAM.

References Cited in the file of this patent

UNITED STATES PATENTS

| Number | Name | Date |
|---|---|---|
| 2,336,492 | MacKay | Dec. 14, 1943 |
| 2,382,994 | Holden | Aug. 21, 1945 |
| 2,463,687 | Gittens | Mar. 8, 1949 |
| 2,464,629 | Young | Mar. 15, 1949 |
| 2,511,614 | Agins et al. | June 13, 1950 |
| 2,513,738 | Noxon | July 4, 1950 |